(No Model.)　　　　　　　　　　　　　　　　　　　　10 Sheets—Sheet 4.

A. C. MILLER & W. BUTTERFIELD.
FRAME FOR GRAIN BINDING AND HARVESTING MACHINES.

No. 395,288.　　　　　　　　　　　　Patented Dec. 25, 1888.

Witnesses:　　　　　　　　　　Inventor:

(No Model.) 10 Sheets—Sheet 5.

A. C. MILLER & W. BUTTERFIELD.
FRAME FOR GRAIN BINDING AND HARVESTING MACHINES.

No. 395,288. Patented Dec. 25, 1888.

Witnesses:
W. R. Kennedy
H. P. Hollingsworth

Inventor:
A. C. Miller
William Butterfield
By Philo T. Dodge, Atty (No Model.) 10 Sheets—Sheet 6.

A. C. MILLER & W. BUTTERFIELD.
FRAME FOR GRAIN BINDING AND HARVESTING MACHINES.

No. 395,288. Patented Dec. 25, 1888.

on line x—x

Witnesses:
W. R. Kennedy
J. P. Hollingsworth

Inventor:
A. C. Miller
William Butterfield
By Phil T. Dodge
Atty

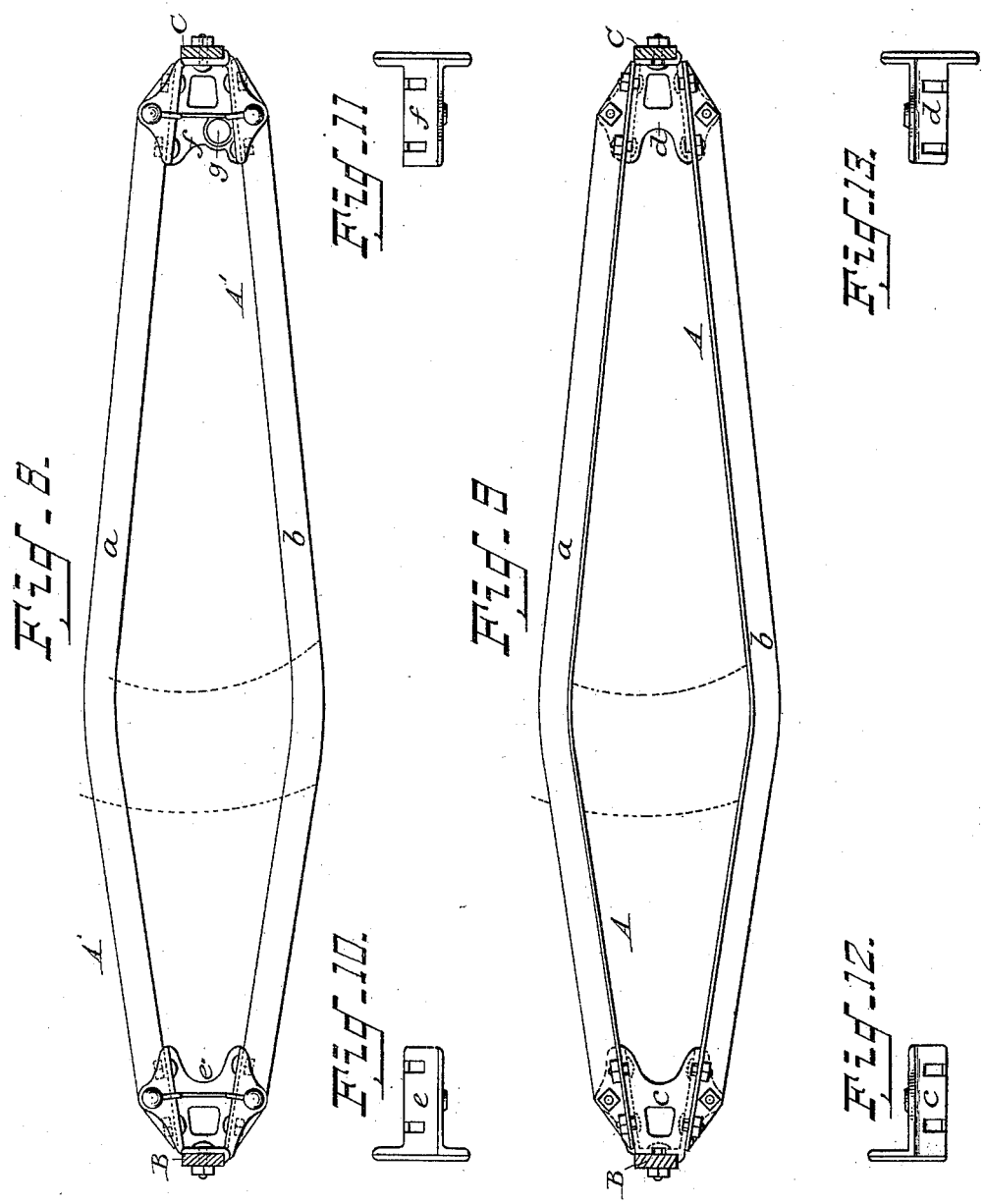

(No Model.) 10 Sheets—Sheet 8.

A. C. MILLER & W. BUTTERFIELD.
FRAME FOR GRAIN BINDING AND HARVESTING MACHINES.

No. 395,288. Patented Dec. 25, 1888.

Witnesses:
W. R. Kennedy
J. P. Hollingsworth

Inventor:
A. C. Miller
William Butterfield
By Phil T. Dodge.
Attorney (No Model.) 10 Sheets—Sheet 9.

A. C. MILLER & W. BUTTERFIELD.
FRAME FOR GRAIN BINDING AND HARVESTING MACHINES.

No. 395,288. Patented Dec. 25, 1888.

Witnesses:
W. R. Kennedy
H. R. Hollingsworth

Inventor:
A. C. Miller
William Butterfield
By Phil T. Dodge, Atty.

(No Model.) 10 Sheets—Sheet 10.
A. C. MILLER & W. BUTTERFIELD.
FRAME FOR GRAIN BINDING AND HARVESTING MACHINES.
No. 395,288. Patented Dec. 25, 1888.
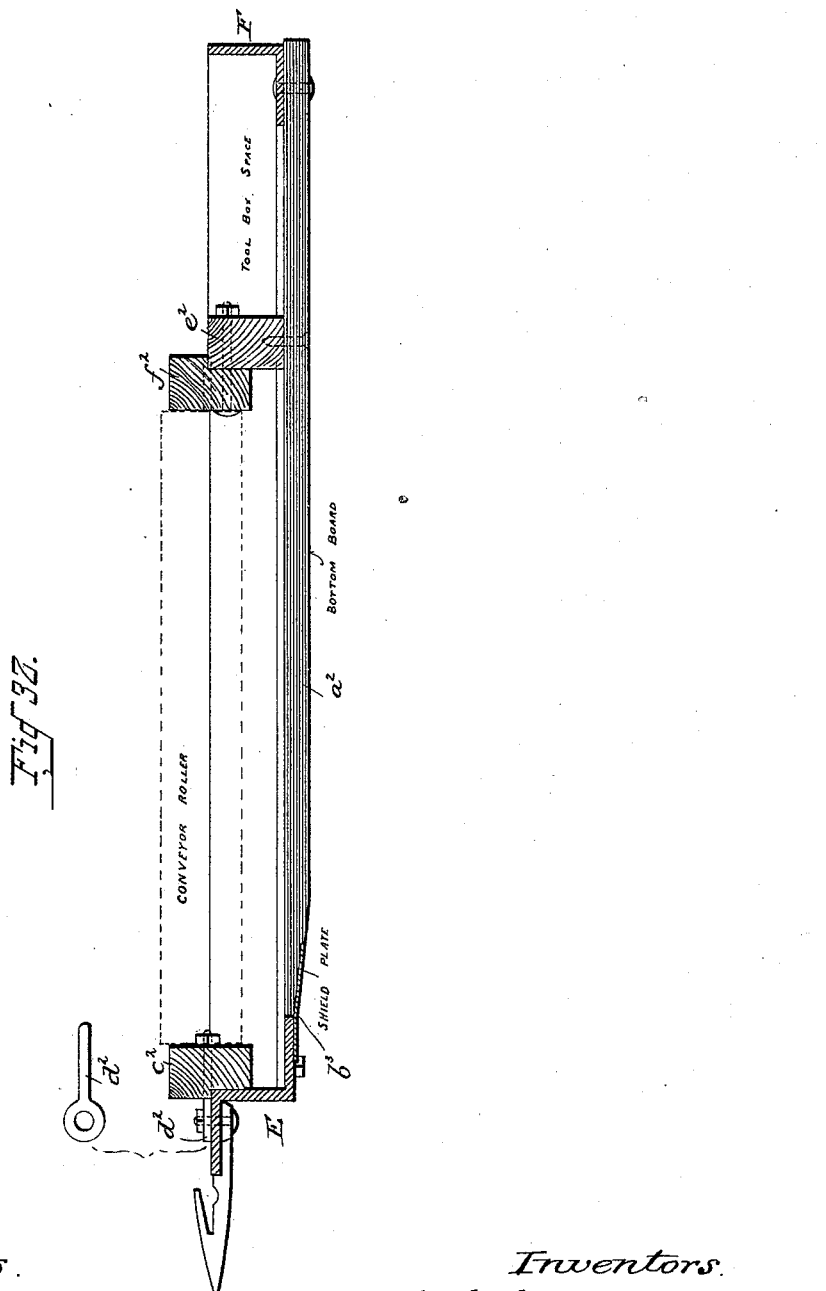

UNITED STATES PATENT OFFICE.

ANDREW C. MILLER AND WILLIAM BUTTERFIELD, OF AUBURN, NEW YORK, ASSIGNORS TO THE D. M. OSBORNE & COMPANY, OF SAME PLACE.

FRAME FOR GRAIN BINDING AND HARVESTING MACHINES.

SPECIFICATION forming part of Letters Patent No. 395,288, dated December 25, 1888.

Application filed October 18, 1886. Serial No. 216,535. (No model.)

*To all whom it may concern:*

Be it known that we, ANDREW C. MILLER and WILLIAM BUTTERFIELD, of Auburn, in the county of Cayuga and State of New York, have invented certain Improvements in Frames for Grain Harvesting and Binding Machines, of which the following is a specification.

Our invention has reference more particularly to that class of harvesting-machines in which a rectangular frame containing the main supporting and driving wheel is attached rigidly to and supports the inner end of the grain-platform, and in which elevators are employed to carry the grain over the top of the main wheel to a binding mechanism supported on the outer side of the wheel-frame.

The aims of the invention are to provide a metallic frame which shall be at once light, cheap, and durable; and to this end it consists in an improved manner of constructing and uniting the various metallic portions, as hereinafter fully described.

Figure 1:
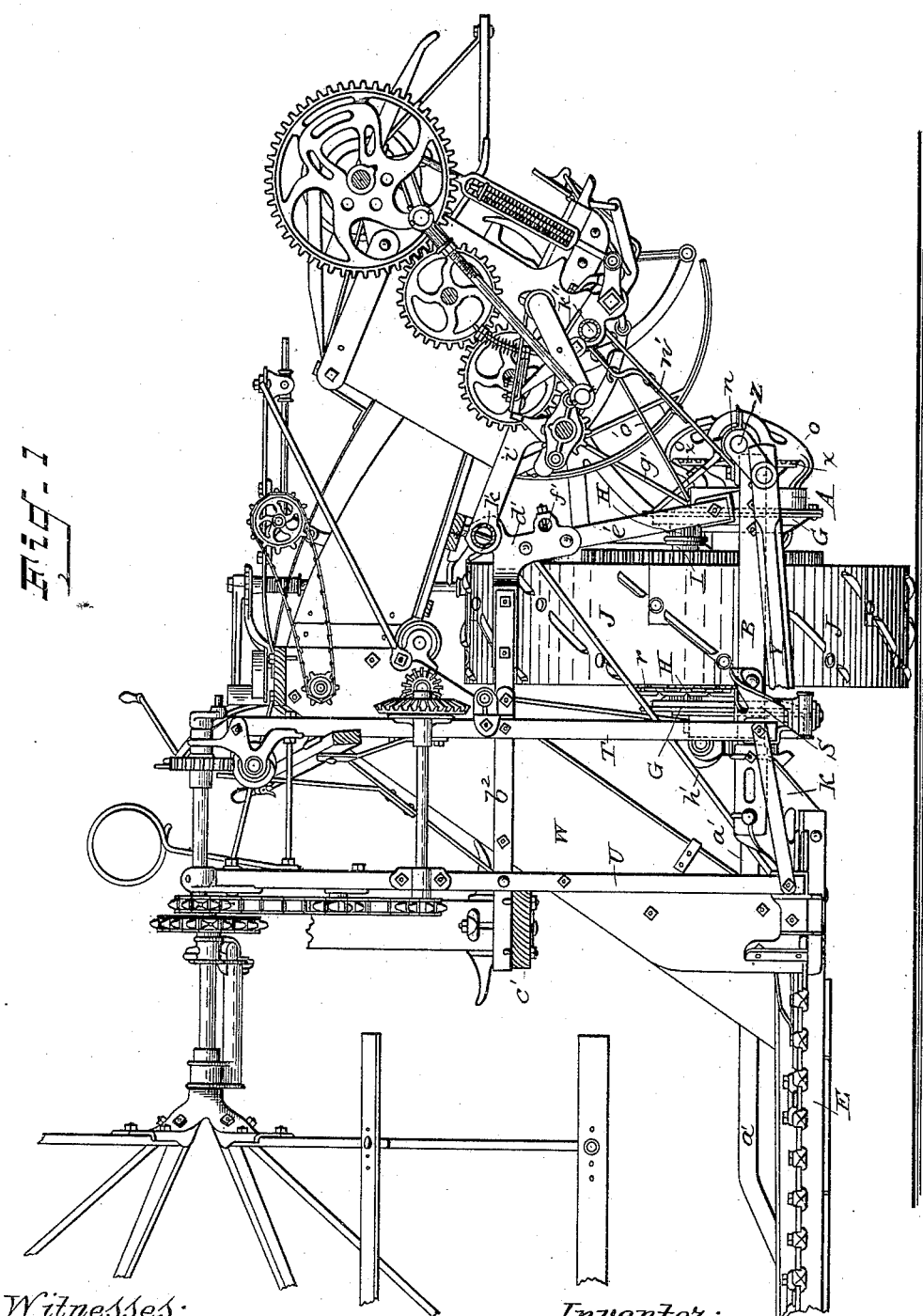
Figure 2:
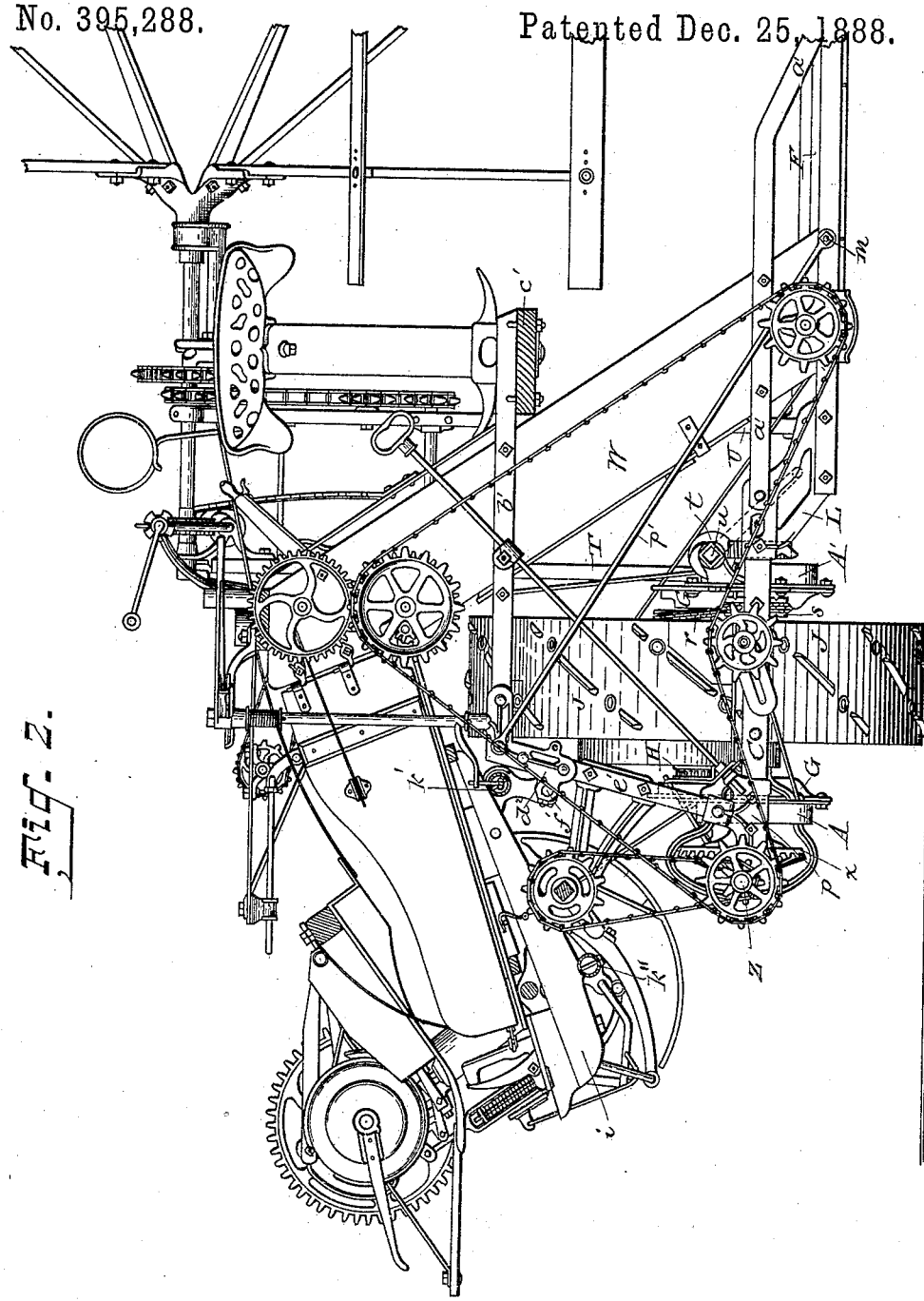
Figure 3:
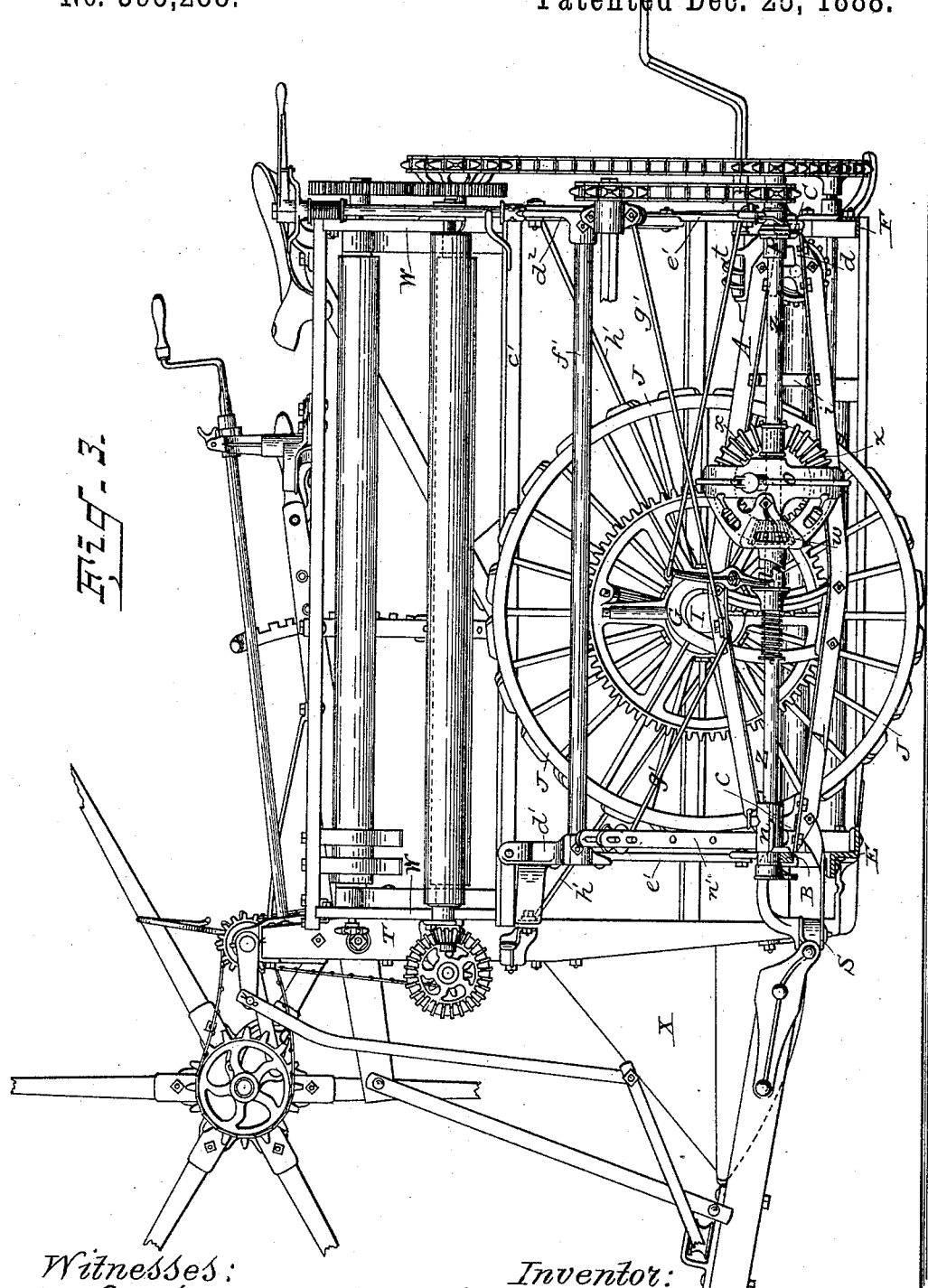
Figure 4:
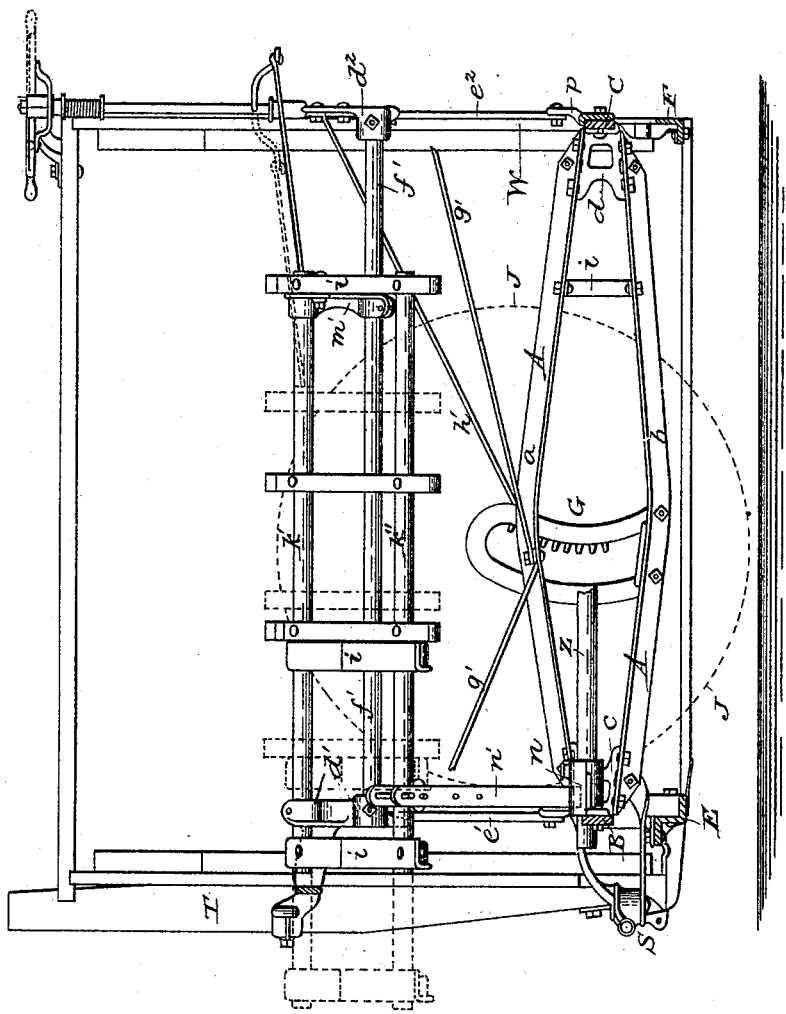
Figure 5:
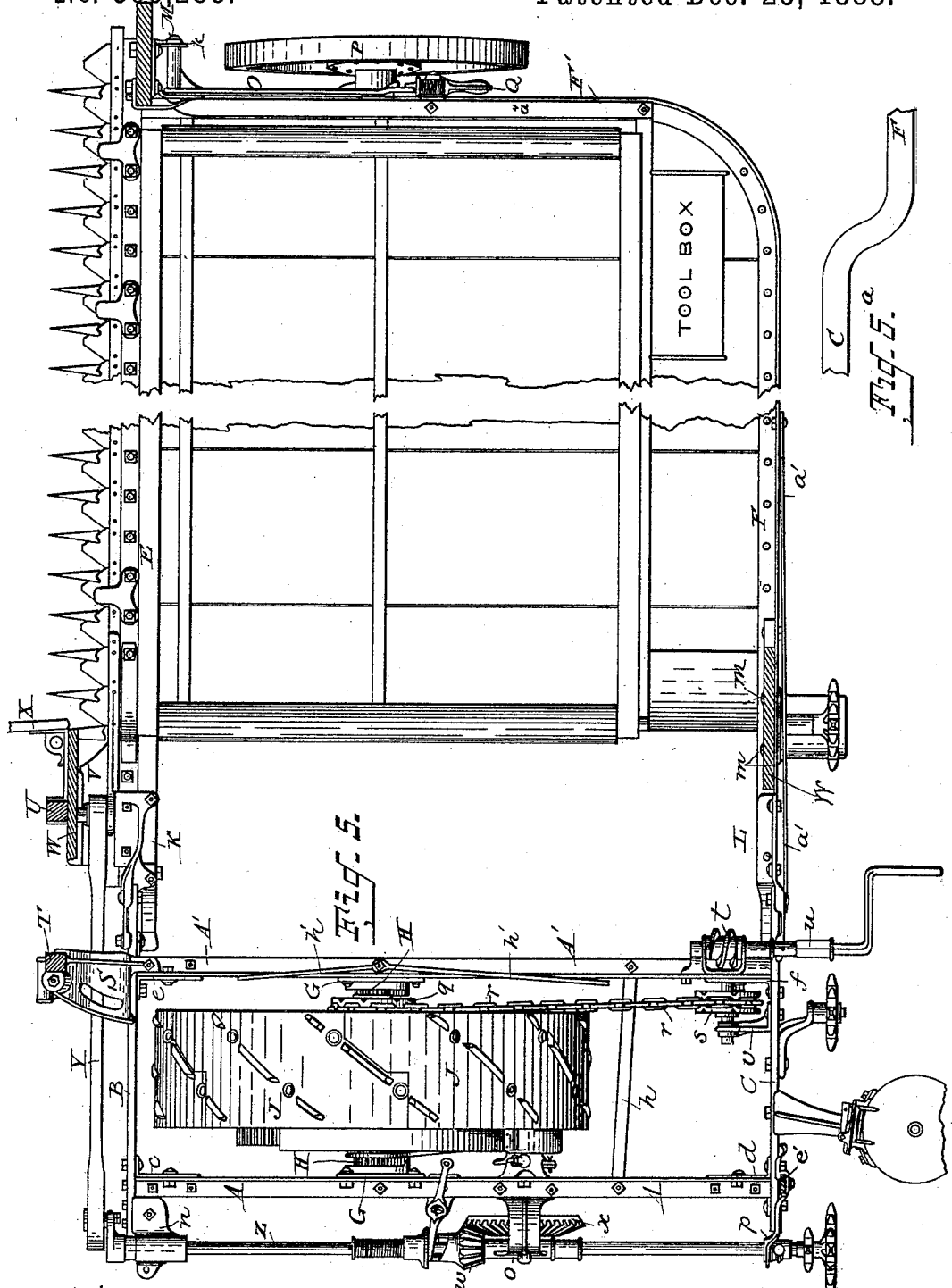
Figure 6:
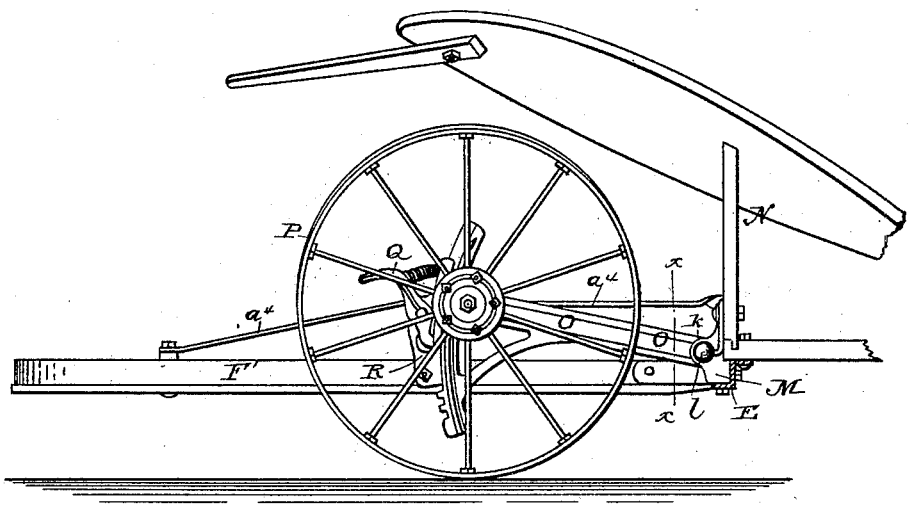
Figure 7:
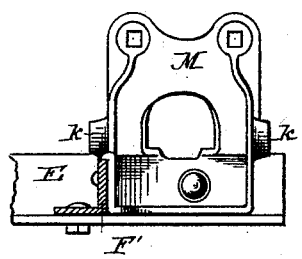

In the accompanying drawings, Figure 1 is a front elevation of a harvesting and binding machine constructed in accordance with our invention, the outer or grain end of the platform being omitted. Fig. 2 is a rear elevation of the same. Fig. 3 is an elevation looking against the stubble side of the harvester, the binding-machine being removed. Fig. 4 is a similar elevation, the gearing and various other parts being removed, and a portion of the binder-frame shown in position to illustrate the manner of adjustably supporting the binder. Fig. 5 is a plan view of the harvester, the reel, the grain-elevator, and the binder-supports being removed to expose the parts thereunder. Fig. 5ᵃ is a view of a modification of the sills. Fig. 6 is an elevation looking against the outer or grain side of the grain-wheel. Fig. 7 is a vertical section on the line $x\ x$ of the preceding figure, showing the casting at the forward grain corner of the frame. Figs. 8 and 9 are side elevations of the two trusses forming portions of the main or wheel frame. Figs. 10, 11, 12, and 13 are plan views illustrating the angle-plates used at the end of said trusses, their positions being indicated by dotted lines. Figs. 14 to 31 represent the various angle-irons and connecting-plates used to unite the other parts of the frame. Fig. 32 is a vertical section through the platform-frame from front to rear, illustrating the manner in which the conveyer-rolls are sustained.

Our invention has reference more particularly to that class of machines in which the wheel or gear frame encircles and is sustained by a single ground-wheel, and in which the "wheel-frame," so called, is connected to the inner end of the platform-frame. As shown more particularly in Fig. 5, the wheel-frame consists of two parallel metal trusses, A and A', extending in a fore and aft direction and united firmly at their ends by metallic cross-bars B and C, which bars are extended beyond the inner truss, A', and connected rigidly or fashioned into front and rear sills, E and F, which give support to the grain-receiving platform and the conveying mechanism, the rear sill being continued forward across the grain end of the frame to the front sill, which latter serves also as the finger-bar.

The trusses A and A' are constructed entirely of metal in the forms represented most clearly in Figs. 8 and 9, each truss consisting of longitudinal bars $a$ and $b$ of an L form in cross-section bolted at their ends firmly to intermediate castings or plates of the forms shown and hereinafter specifically described. The bars $a$ and $b$ are one or both bent, as shown in the drawings, in order to separate them at the middle a greater distance than at the ends, this formation allowing the ends to be brought near each other, while affording a wide bearing for the axle-plates, which are bolted to them at the middle.

The front and rear bars, B and C, are preferably made of a rectangular form in cross-section, with a vertical depth much greater than their thickness, and are bolted firmly to the outer vertical faces of the angle-plates or castings located within the ends of the trusses. These four castings are fashioned in such manner as to afford a firm bearing for the members of the truss and for the cross-bars, and are flanged, as shown in the several figures, in order to embrace the edges of the various bars and thus give increased rigidity to the structure. The casting c at the forward end of the outer truss, A, is made in the form shown in Figs. 9, 12, 29, 30, and 31. It will be perceived that it has broad bearing-faces and a hollow interior in order to reduce its weight as much as possible.

Figure 26:
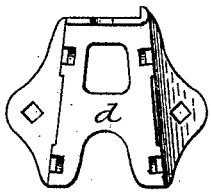
Figure 27:
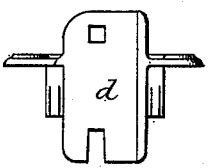
Figure 28:
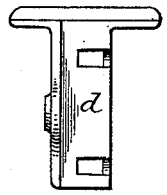
Figure 29:
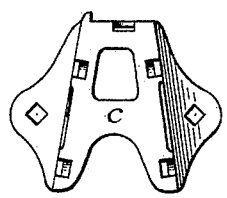
Figure 30:
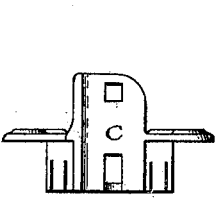
Figure 31:
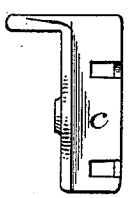

The block d, filling the rear end of the outer truss, is of the form shown in Figs. 26, 27, and 28, being provided, like the block c, with a flange at the lower edge to bear beneath the cross-bar.

The inner truss has its forward casting, e, of the form shown in Figs. 8, 10, 23, 24, and 25. The rear casting, f, of the inner truss is shown in Figs. 8, 11, 20, 21, and 22. It will be observed that it is provided, in addition to its other features, with a transverse hole or opening, g, to receive the shaft of the platform-adjusting devices hereinafter referred to.

It will be noted that each of the corner castings above referred to is provided not only with horizontal faces to bear against the bars a and b, but also with vertical flanges or faces seated against the corresponding faces of said bars. Connecting-bolts are passed both vertically and horizontally through the bars a and b, and through the castings. The cross-bars B and C are secured in place by horizontal bolts.

By the peculiar construction above described the several parts of the frame are strongly and rigidly united, so that the frame will maintain its original shape, notwithstanding the severe strains to which it is subjected when the machine is in action.

For the purpose of adjustably supporting the frame on the main wheel, we bolt to the inner face of each truss an upright slotted axle-plate, G, containing a curved slot with gear-teeth on one side. In these slots we mount pinions H, fixed on opposite ends of a horizontal shaft, I, on which the main wheel J is free to revolve. The pinions, rotated by means hereinafter described, serve to raise and lower the frame and to maintain the same at the required elevation. The bearing-plates G serve not only to sustain the truss-frames, but, bearing against their inner faces as braces, hold them in position and prevent the angular bars from being sprung or twisted out of shape.

As an additional means of stiffening the frame, connecting-bars h may be bolted to the truss-frames in rear of the ground-wheel, and connecting-bars i bolted to the upper and lower members of each truss, as shown in Figs. 3, 4, and 5. The front and rear bars, B and C, are extended inward toward the grain side of the machine beyond the inner truss, A', and, as before mentioned, give firm support to the front and rear sills, E and F. The rear sill, F, is of an L form in cross-section, and the front sill, E, of the double angular form shown in Fig. 3 and elsewhere, its upper forwardly-projecting flange serving as a support for the guard-fingers, which are bolted thereto.

Figure 14:
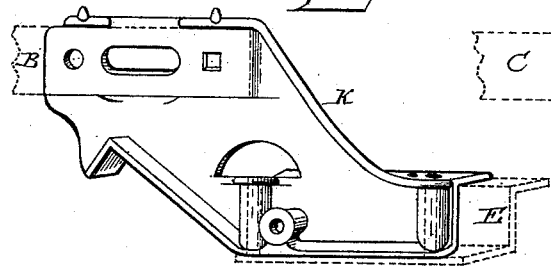
Figure 15:
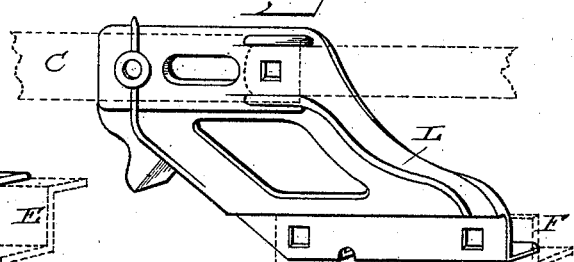
Figure 16:
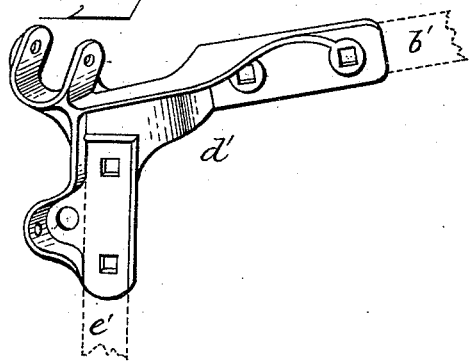
Figure 17:
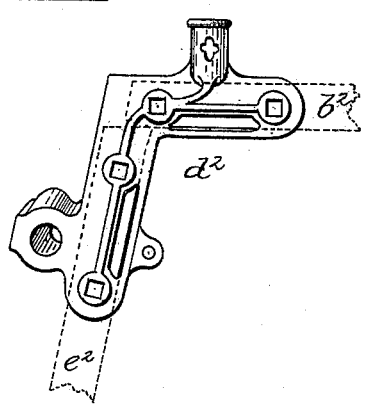
Figure 18:
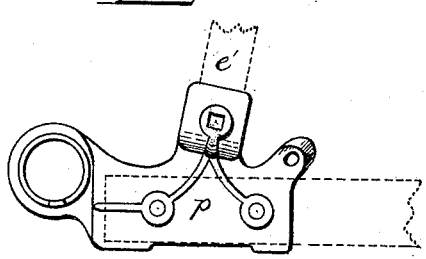
Figure 19:
Figure 20:
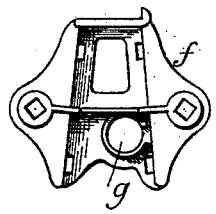
Figure 21:
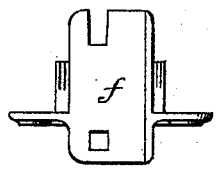
Figure 22:
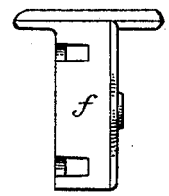
Figure 23:
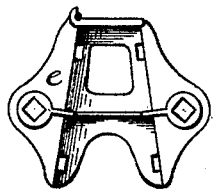
Figure 24:
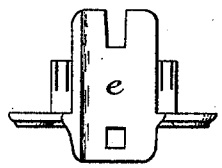
Figure 25:
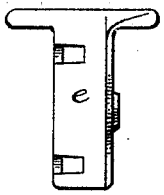

The respective sills may form continuations of the front and rear bars, B and C, being forged thereto or rolled integral therewith, as represented in Fig. 5ª; but we prefer to connect the sills to the projecting ends of the bars by means of intermediate flanged splicing or coupling plates K and L, as shown in Figs. 14 and 15. These plates are not claimed as of our invention, but will constitute the subject-matter of a separate application in the name of another. Our invention in this regard resides in the sills connected rigidly to and forming practically continuations of the bars B and C, and this whether the parts are united by the splicing-plates or the sills formed integral with the bars by which they are supported.

In order to give greater stiffness to the frame in a vertical direction, and to prevent the sagging of the outer rear corner of the platform, we provide a brace-bar, a', bolted to the rear end of the wheel-frame or the rear coupling-plate and extended thence outward over the rear sill a considerable distance, and finally carried downward and bolted firmly to the sill, as shown in the several figures. This brace may be formed and applied in any appropriate manner, provided it connects the rear end of the wheel-frame with the middle portion of the rear sill.

The rear sill, F, is curved at its outer end and continued forward, as before mentioned and as shown at F', Fig. 5, to a point at or near the front sill or finger-bar, E, where the two parts are united by a casting, M. (Plainly represented in Figs. 5, 6, and 7.) In this manner the extension F' of the rear sill is caused to serve as the outer end of the platform-frame. The casting M is adapted to fit within the rear angle of the finger-bar and against the outer side of the part F', to both of which it is firmly bolted. It is further formed with an upright flange at its front to receive the divider N, which is united thereto and to the finger-bar by bolts, as shown. The casting M is further provided with ears k, giving support to a horizontal pivot-bolt, l, which supports the forward end of an arm, O, the rear end of which bears a journal on which the grain-wheel P is mounted. The forward end of the arm O is seated between the ears of the casting M, and is widened, as shown, to afford a bearing for a long pivot. As the arm is free to swing on its pivot, it permits the platform to be raised and lowered. The platform is fixed at the required height by means of a pivoted spring-actuated latch, Q, entering notches in the end of the arm O, this latch being mounted on a plate, R, which is bolted to the end of the frame and adapted to receive and guide the end of the arm. The grain end of the frame is stiffened by a brace-bar, $a^4$, secured at its forward end to the divider above the level of the front sill and extended thence rearward to the rear sill, to which it is bolted. Midway of its length this brace is supported on an arm or plate rising from the outer end of the frame, whereby the brace is caused to act the more effectively in sustaining the rear corner of the platform.

The foregoing parts constitute jointly the base-frame of the machine—that is to say, the frame adapted to carry the two wheels, the cutting mechanism, and the platform.

To the inner front corner of the wheel-frame is bolted a casting, S, formed as shown, to support a swiveling-plate to which the tongue is attached, and also to assist in supporting one of the reel-standards, T. The second reel-standard, U, is supported by a casting, V, bolted to the inner or heel end of the finger-bar, as shown in the several figures, and extending forward, as shown, that it may assist in supporting the forward end of the elevator-frame W and the inner divider, X.

The frame W embraces, as usual, the two upright boards or planks connected at their top by a cross-plank, and adapted to give support to the journals of the horizontal rolls which carry the elevator-canvas, in the usual manner. The rear standard of the elevator-frame is extended downward and united by horizontal bolts $m$ to the vertical flange of the rear sill, as shown in Fig. 5.

The cutting mechanism, of the usual type, has its cutter-bar driven by a pitman, Y, from a crank-shaft, Z, lying horizontally along the stubble end of the frame on the outside. To give proper support to this shaft, we provide three arms or brackets, $n, o$, and $p$, which are bolted, respectively, to the front and rear bars, B C, and to the truss-frame A, the bars being extended, as shown, outside of the truss to receive and support the arms, which are suitably flanged to engage therewith. The shaft Z receives motion through a clutch and beveled pinion, $w$, thereon from a gear-wheel, $x$, the shaft of which is mounted in the bracket $o$, and provided at its inner end with a spur-pinion, receiving motion in the ordinary manner from a gear-ring on the main wheel.

To effect the vertical adjustment of the wheel-frame, the main axle, having the adjusting-pinions applied as before described, is provided with a sprocket-wheel, $q$, around which an endless chain, $r$, is passed to an operating-wheel, $s$, as in existing machines. The wheel $s$ is mounted on a horizontal shaft supported in castings at the inner rear corner of the wheel-frame, the shaft being also provided with a worm-wheel engaged by a worm, $t$, on a horizontal shaft, $u$, which is projected in rear of the frame in position to receive an operating-crank. The shaft of the sprocket-wheel $s$ is supported at one end in the corner-block $f$, before referred to, and at the opposite end in a special casting or bracket, $v$. The worm-shaft is mounted in a special casting bolted to the inner face of the truss A'.

We use in connection with our harvester a binding-machine of any suitable form supported on the inner or stubble side of the main wheel. In the drawings we have shown a machine of the well-known Osborne-Appleby type. In order to give support to this machine, we adopt the special construction which will now be described. Across the front and rear ends of the elevator-frame we bolt thereto horizontal bars $b'$ and $b^2$, extended beyond the frame on the grain side to receive and support the longitudinal seat-plank $c'$, and also extended on the stubble side a suitable distance to receive, respectively, angular brackets $d'$ and $d^2$, (shown in Figs. 16 and 17,) which are bolted thereto. To these castings $d'$ and $d^2$ are bolted, respectively, bars $e'$ and $e^2$, extending downward and bolted at their lower ends to angle-plates at the outer corners of the wheel-frame. The bar $e^2$ is bolted to the angle-plate or bracket $p$, before referred to as the support of the shaft Z, as plainly shown in Figs. 5 and 18.

The corner-pieces $d'$ and $d^2$ are connected by a cross-bar, $f'$, preferably tubular, bolted firmly into seats formed therein, as shown in Figs. 3, 4, 16, and 17. The parts above described constitute a rigid angular frame on the wheel-frame, outside of the wheel, well adapted to sustain the binder. This secondary frame is strengthened by two braces, $g'$, extending from its outer corners inward and downward diagonally to the top of the outside truss, A, to which they are bolted. A second pair of brace-rods, $h'$, is extended from the top of the inner truss upward in opposite directions to the bars $b'$ $b^2$, inside of the wheel, as in Figs. 1 and 3. By means of the braces the binder-supports and the elevator are all tied in position and prevented from swaying forward or backward.

The binding mechanism proper is constructed, as usual, with a base-frame consisting of sills $i'$, bolted to two horizontal tubes or rods, $k'$ $k''$, lying in a fore and aft direction.

The binder is adjustably sustained on our frame, as seen in Figs. 1, 2, and 4. The upper and inner tube, $k'$, of the binder-frame slides at its forward end in a forked bearing on the top of the plate $d'$, and is provided at its rear end with a fixed plate, $m'$, the lower end of which is forked to receive and arranged to slide upon the stationary rod $f'$. At its lower stubble side the binder-frame has its rod $k''$ mounted to slide in a roller in the forked upper end of an arm, $n'$, bolted to the front outer corner of the wheel-frame, and braced by a rod, $o'$, extending to the outer truss. In this manner the binder is firmly sustained, but permitted to slide forward and backward, as usual, to place the band at the middle of grain varying in length. The lower or outer side of the binder-frame may be supported otherwise than by the bar $n'$, our invention as regards the binder-support relating, mainly, to the means for sustaining the upper or inner edge of the frame, consisting of two horizontal rods or bars attached one to the binder and the other to the harvester, each bar provided with a guide or arm which slides on the other bar. The adjusting devices may be of any ordinary or suitable construction.

To stiffen the harvester, we commonly use, in addition to the braces already mentioned, a rod, $p'$, extending from the rear upper corner of the binder-support to the rear sill, near the foot of the elevator.

The details of the binder and its actuating mechanism, the reel, the conveyer, and elevator, and the other customary and necessary parts of the machine may be of ordinary construction, as they constitute no part of the present invention.

For the purpose of delivering the grain horizontally from the main platform to the end of the elevator-belts, we employ the usual canvas apron, sustained at its ends by horizontal rolls extending across the platform from front to rear and supported by journals at their ends. In connection with our improved frame we support the timbers which sustain the conveyer-rolls in the manner represented in Figs. 5 and 32, in which $a^2$ represents a bottom board or sheathing covering the entire under side of the platform-frame, its rear end riveted or otherwise secured to the bottom flange of the rear sill, F, and its front edge abutted against the lower flange of the front sill or finger-bar, and united thereto by a splice-plate, $b^3$, in a manner heretofore practiced. Lengthwise of the finger-bar we place a timber, $c^2$, rabbeted or shouldered to fit over or upon its inner rear corner and against its inner vertical face, and secure the same in place by means of eyebolts $d^2$, which are united to the upper face of the finger-bar by vertical bolts. These eyebolts, passing backward through the timber, are secured by nuts on their inner ends. At a suitable distance in front of the rear sill, and parallel therewith, we seat a timber, $e^2$, on the sheathing $a^2$, and screw or otherwise fasten it thereto. To the front side of this timber we bolt a second timber, $f^2$, rabbeted or shouldered to bear thereon. Into the timbers $c^2$ and $f^2$, which, it will be observed, are supported mainly by their shoulders, we insert the journals of the conveyer-rolls. The space between the timber $e^2$ and the rear sill may be utilized as a tool-box or otherwise, as preferred.

Having thus described our invention, what we claim is—

1. The truss for a harvester-frame, consisting of two bars of angle-iron, one overlying the other, and the blocks or castings introduced between the bars, the latter being independently secured by separate vertical bolts to said blocks.

2. In a harvester wheel-frame, the combination of an under bar, $b$, a top bar, $a$, having a horizontal and a vertical web or flange, the two bars widely separated in the middle, the blocks or castings inserted between the two ends of said bars against their horizontal flanges and bolted thereto, and the axle-plate secured by horizontal bolts to the vertical flanges of the bars.

3. In a metallic wheel-frame for a harvester, the two trusses, each consisting of an upper and a lower bar of angle-iron, and two flanged blocks or castings bolted between their ends, in combination with the front cross-bar, C, and the rear cross-bar, B; seated against the vertical faces of the blocks and against flanges thereon, and attached thereto by bolts.

4. In a truss for a harvester-frame, an upper bar, $a$, and an under bar, $b$, each of L form in cross-section, in combination with blocks or castings $c$ $d$, seated between their ends, with faces bearing against both the vertical and the horizontal flanges of the bars and connected thereto both by vertical and horizontal bolts, as shown.

5. In a truss-frame for a harvester, the upper bar, $a$, of L form in cross-section, the hollow flanged end blocks or castings, $c$ and $d$, seated thereunder and connected thereto by horizontal and vertical bolts, and the bottom bar, $b$, of L form in cross-section, seated beneath the end blocks and independently attached thereto by horizontal and vertical bolts.

6. The main frame for a harvester, comprising, first, two trusses, each composed of upper and lower angle-bars and blocks or castings bolted to and between their ends, as shown; second, axle-plates bolted against the vertical faces of the bars, and, third, cross-bars B and C, of deep section, bolted against the outer or end faces of the blocks and extended beyond the truss on the inner or grain side, the finger-bar E, sustained by and forming a rigid continuation of the bar B, and the rear sill, F, attached to and forming a rigid continuation of the bar C, and carried forward at the grain side to the finger-bar.

7. In a truss for a harvester-frame, two metallic bars of L form in cross-section arranged one above the other with vertical flanges on their adjacent sides and with horizontal flanges on their opposite faces, in combination with blocks or castings bolted to and between their ends, and axle-plates bolted to their inner vertical flanges, and provided with lugs or shoulders bearing against their horizontal flanges.

8. In a harvester, the rear platform-sill, F, of L form in cross-section, in combination with the end board, W, of the elevator-frame mounted thereon and secured to its vertical flange.

9. In a harvester-frame, the upper and lower truss members, and the intermediate block, $f$, containing the shaft-bearing, the cross-bar C, bolted to the intermediate block, the arm $v$, bolted to said bar, and the chain-wheel $s$, having its journals mounted in said block and arm, respectively.

10. In combination with the wheel-frame and the elevator-frame thereon, the horizontal bars $b^2$, adapted to sustain the seat-plank at one end, the angle-plates $d'$, bolted to the stubble ends of said bars, the sustaining-bars $e'$, bolted at one end to the angle-plates and at the opposite end to the stubble side of the wheel-frame, and the bar $f'$, secured at its ends to the respective angle-plates, as shown, whereby the parts are tied together and a rigid support for the binder afforded.

11. In a metallic harvester-frame, the front sill or finger-bar of angular cross-section, the side bar, F', of angular cross-section, and the casting M, bolted to and connecting said bars, the grain-wheel and wheel-carrying arm connected by a horizontal pivot to the casting M.

12. In combination with the angular bar F' on the grain side of the platform, the casting M, bolted thereto, said casting formed, as described and shown, to receive and support the divider.

13. In a harvester, the combination of the metallic end bar, F', the angular front sill or finger-bar, the casting M at the forward corner, and the overlying brace $a^4$, extending from the block M to the rear portion of the bar F'.

14. The harvesting-machine, provided with the fixed bar $f'$, lying in a fore and aft direction, and with the fixed front guide, $d'$, in combination with the adjustable binder-frame having the fore and aft bar $k'$, and the rear plate or arm, $m'$, the bar $k'$ being arranged to slide at its front end in the guide $d'$, and the plate $m'$ arranged to slide on the bar $f'$, whereby a sliding support for the binder is afforded.

15. In a harvester, the finger-bar having the angular cross-section, in combination with the rabbeted timber $c^2$, seated upon the upper rear corner of the finger-bar and bolted thereto, and the conveyer-roll mounted at its forward end in said timber, whereby the finger-bar and timber are kept in exact alignment and a firm support for the conveyer-roll afforded.

16. In a harvester, the angular metal platform-sills E and F, and the bottom board, $a^2$, attached to their horizontal flanges, in combination with a timber, $e^2$, seated thereon, the timber $f^2$, seated upon the first-named timber, and the conveyer-roll mounted at its rear end in the timber $f^2$.

17. In a harvester, the two truss-frames and the rear cross-bar connecting them, in combination with the rear platform-sill rigidly connected to said cross-bar at a lower level, and the sill-sustaining arm or brace $a'$, extending stubbleward from the cross-bar to the sill.

18. In a harvester, the main wheel-frame and the rear platform-sill rigidly secured to its under side, in combination with the brace $a'$, attached rigidly to the rear end of the wheel-frame and extended thence to a distant point on the sill and attached thereto.

In testimony whereof we hereunto set our hands, this 13th day of October, 1886, in the presence of two attesting witnesses.

ANDREW C. MILLER.
WILLIAM BUTTERFIELD.

Witnesses:
T. M. OSBORNE,
J. FRANK DAVIS.